(12) United States Patent
Zhu et al.

(10) Patent No.: US 9,037,732 B2
(45) Date of Patent: May 19, 2015

(54) METHOD OF IMPLEMENTING UE CAPABILITY EXCHANGE AND ROUTE CONTROL FOR PARALLEL IMS AND CS SERVICES

(75) Inventors: Dongming Zhu, Shenzhen (CN); Yajuan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2832 days.

(21) Appl. No.: 11/376,369

(22) Filed: Mar. 15, 2006

(65) Prior Publication Data
US 2006/0218291 A1    Sep. 28, 2006

(30) Foreign Application Priority Data

Mar. 28, 2005  (CN) .......................... 2005 1 0059319
Aug. 26, 2005  (CN) .......................... 2005 1 0093365

(51) Int. Cl.
*G06F 15/16*    (2006.01)
*H04B 7/00*    (2006.01)
*H04L 12/66*   (2006.01)
(Continued)

(52) U.S. Cl.
CPC ............ *H04L 65/1069* (2013.01); *H04L 69/24* (2013.01); *H04L 65/1016* (2013.01)

(58) Field of Classification Search
CPC ................................................. H04L 65/1016
USPC ............... 709/227, 228, 229; 455/466, 412.1; 370/310, 352
See application file for complete search history.

(56) References Cited

U.S. PATENT DOCUMENTS

2002/0062379 A1* 5/2002 Widegren et al. ............. 709/227
2002/0114305 A1* 8/2002 Oyama et al. ................. 370/338
(Continued)

FOREIGN PATENT DOCUMENTS

CN         1842084 A      10/2006
WO         02/104057      12/2002
(Continued)

OTHER PUBLICATIONS

3GPP TR 23.899 v1.0.0 Publication Date (Dec. 2004) 3rd Generation PartnershipProject; Technical Specification Group Services and System Aspects; Report on alternative architectures for combining CS Bearers with IMS; Release 6.*

(Continued)

*Primary Examiner* — Philip Chea
*Assistant Examiner* — Mohammed Ahmed (57) ABSTRACT

The present invention discloses a method of implementing UE capability exchange and a method of route control for parallel IMS and CS services in communication system, so as to distinguish among multiple UEs sharing a same IMPU during capability exchange and route control. Said method comprises: each of UEs involved in capability exchange sending its capability information to the opposite party respectively; the opposite party storing these information as well as the correlation between the information and the service ID; The UE including equipment ID of the opposite UE in an initiated service request; service control function entity in the network utilizing the equipment ID to query the established correlation among equipment ID, service ID, and address of the UE, so as to determine the address of the destination UE and route the service request to the destination UE. Said equipment ID identifies effectively a UE in the network.

44 Claims, 4 Drawing Sheets (51) Int. Cl.
  *H04L 12/58*   (2006.01)
  *H04W 4/00*   (2009.01)
  *H04L 29/06*   (2006.01)

(56) References Cited

U.S. PATENT DOCUMENTS

| | | | | |
|---|---|---|---|---|
| 2002/0120749 | A1* | 8/2002 | Widegren et al. | 709/227 |
| 2002/0133600 | A1* | 9/2002 | Williams et al. | 709/228 |
| 2002/0165966 | A1* | 11/2002 | Widegren et al. | 709/226 |
| 2003/0156578 | A1* | 8/2003 | Bergenlid et al. | 370/352 |
| 2003/0172160 | A9* | 9/2003 | Widegren et al. | 709/226 |
| 2003/0229699 | A1* | 12/2003 | Moran et al. | 709/227 |
| 2004/0028080 | A1* | 2/2004 | Samarasinghe et al. | 370/486 |
| 2004/0184435 | A1 | 9/2004 | Westeman | |
| 2004/0185885 | A1* | 9/2004 | Kock | 455/466 |
| 2004/0196796 | A1* | 10/2004 | Bajko et al. | 370/310 |
| 2005/0041578 | A1* | 2/2005 | Huotari et al. | 370/229 |
| 2007/0165599 | A1* | 7/2007 | Skog et al. | 370/352 |

FOREIGN PATENT DOCUMENTS

| | | |
|---|---|---|
| WO | WO 03/081876 A1 | 10/2003 |
| WO | 2004/019640 A1 | 3/2004 |
| WO | 2004/071048 | 8/2004 |
| WO | 2004/086703 | 10/2004 |
| WO | WO 2004/089022 A1 | 10/2004 |
| WO | 2005/027460 | 3/2005 |
| WO | 2005/064957 | 7/2005 |

OTHER PUBLICATIONS

3GPP S2: "Report on alternative architectures for combining CS Bearers with IMS." 3GPP TR 23.899 v1.0.0 (2004).

Rosenberg, J. "Obtaining and Using Globally Routable User Agent (UA) URIs (GRUU) in the Session Initiation Protocol (SIP)." IETF Standard-Working-Draft, Internet Engineering Task Force, IETF, CH, vol. Sip, No. 2 (2004) pp. 3-15.

"3rd Generation Partnership Project; Technical Specification Group Core Network; IP Multimedia Call Control Protocol based on Session Initiation Protocol (SIP) and Session Description Protocol (SDP); Stage 3 (Release 5)", 3GPP TS 24.229 v5.12.0, Mar. 2005, 261 pages.

"3rd Generation Partnership Project; Technical Specification Group Services and System Aspects; IP Multimedia Subsystem (IMS); Stage 2 (Release 6)", 3GPP TS 23.228 v6.9.0, Mar. 2005, 179 pages.

"3rd Generation Partnership Project; Technical Specification Group Services and System Aspects; Combining CS and IMS services; Stage 2; (Release 7)", 3GPP TS 23.279 v1.0.0, Feb. 2005, 18 pages.

"3rd Generation Partnership Project; Technical Specification Group Services and System Aspects; Report on alternative architectures for combining CS Bearers with IMS; Release 6", 3GPP TR 23.899 v1.1.0, Feb. 2005, 55 pages.

"3rd Generation Partnership Project; Technical Specification Group Core Network and Terminals; Combining Circuit Switched (CS) and IP Multimedia Subsystem (IMS) services; Stage 3 (Release 11)", 3GPP TS 24.279 v11.0.0, Sep. 2012, 78 pages.

M. Handley, et al., "SDP: Session Description Protocol", Network Working Group, Apr. 1998, 38 pages.

J. Rosenberg, et al., "SIP: Session Initiation Protocol", Network Working Group, Jun. 2002, 72 pages.

* cited by examiner

METHOD OF IMPLEMENTING UE CAPABILITY EXCHANGE AND ROUTE CONTROL FOR PARALLEL IMS AND CS SERVICES

FIELD OF THE INVENTION

The present invention relates to the third generation (3G) mobile communication network technology, and in particular to a method of implementing UE (User Equipment) capability exchange and route control in Combining CS Bearers with IP Multimedia Subsystem (CSI) services.

BACKGROUND OF THE INVENTION

With the development of mobile communication technology, people are no longer satisfied with the simple speech communication fashion. Instead, they need a brand new multimedia communication fashion, which includes not only simple audio/video communication, but also instant messaging, browsing at-one-site, cooperative work, and stream media services, etc., especially services combining new communication approaches with conventional speech communication. Based on the trend of combination between Internet and telecom networks, various standardization organizations have put forward the concept of next generation network (NGN). 3GPP has introduced IP multimedia subsystem (IMS) in full IP service network architecture based on packet-switched bearer network, with the aim of masking off the user access modes, controlling the degree of openness of service capability, and providing multimedia communication experience according to personalized user data. The main functional entities in IMS include Call State Control Function (CSCF) entity that controls user registration and session control, etc., Application Server (AS) that provides various service logic control functions, Home Subscriber Server (HSS) that provides central management of subscribers' subscription data, and Media Gateway Control Function/IMS Media Gateway (MGCF/IM-MGW) for implementing intercommunication with circuit switched (CS) networks. Users access IMS via the proxy CSCF nodes (P-CSCFs) in the networks in which the users are currently located, while service control as well as interaction with AS are accomplished by the home serving CSCF nodes (S-CSCFs); IMS employs Session Initiation Protocol (SIP) for signaling exchange and session negotiation, and as the interface protocols between terminals and CSCF, between CSCFs, and between CSCFs and AS.

A conventional communication network comprises circuit switched (CS) domain and packet switched (PS) domain, which accomplish CS service (including voice service, circuit-type data service, and fax service, etc.) and packet-based data service, respectively. IMS service comprises control part and media content part; wherein, the control part is IMS signaling exchange between IMS terminals and network entities in IMS domain to control IMS service; the media content part comprises various types of media including image, speech, data, audio, etc. Both IMS signaling and media streams are carried on PS domain. Because CS network and PS network use network resources differently (CS network monopolizes resources, while PS network shares resources), for services having higher requirement for time delay, such as voice service, the Quality of Service (QoS) will be degraded by a certain degree if the service is implemented in IMS, compared with that implemented in CS, thus it is hard to meet the service requirements of the operators and subscribers. In view of this, the International Standardization Organization 3GPP has put forward Combining CS Bearers with IMS (CSI) services, which comprises two implementations: CS/CSB and IMS/CSB; wherein, CS/CSB refers to CS/IMS parallel integrated services, i.e., CS calls and IMS sessions are fully controlled by corresponding domains respectively, and correlated at the UEs of both parties, thereby providing richer services taking the advantages of CS/IMS integration; IMS/CSB refers to CS bearer being used in IMS sessions, that is, the establishment of CS bearer which is specifically performed in CS domain is controlled by IMS service logic, so as to solve the Quality of Service (QoS) problem in the part of IMS Services that have higher requirement for time delay.

Figure 1:
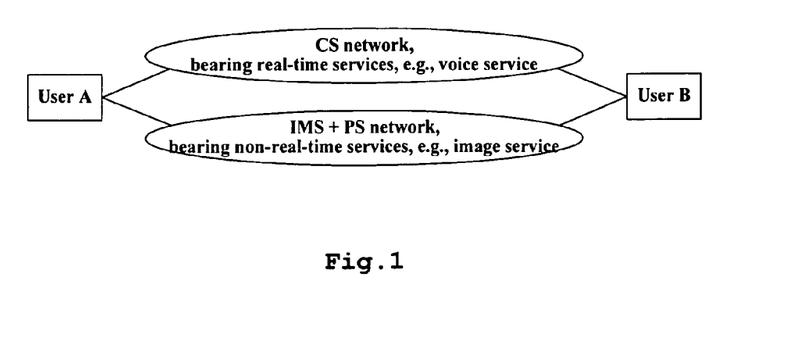
FIG. 1 is a schematic diagram of CSI phase 1 services in prior art.

Since the implementation of IMS/CSB requires cooperation of UEs and IMS network, and is relatively more complex, 3GPP decides to divide CSI into two phases so as to implement above services as soon as possible: in phase 1, end-to-end CS/CSB shall be implemented on the basis of the capability of presently existing networks as far as possible. CS calls and IMS sessions are controlled respectively in CS domain and IMS domain. IMS sessions can be added over established CS calls, or CS calls can be added over established IMS sessions, with correlation between CS calls and IMS sessions being only accomplished at the UEs of both parties according to the requirements of the specific service application, as shown in FIG. 1.

Since the above-described services in CSI phase 1 require the UEs and the networks at both parties to maintain air interface connection of CS and PS at the same time, end-to-end capability information exchange needs to be implemented before a session/call in the other domain is added over an established call/session; the content of the exchange includes UE capability, capability of the radio access network which is accessed currently, and user identity (E.164 number in CS domain or SIP-URL in IMS domain) for call/session establishment in another domain; in addition, since the CS calls and IMS sessions in the services in CSI phase 1 are controlled by CS and IMS networks respectively, the existing services in the two domains may have adverse effects on the calls/sessions; it is necessary to take into account as to how to guarantee the establishment of calls/sessions between the same two UEs.

3GPP TS 23.279 is the technical standard in 3GPP for services in the CSI phase 1. In the latest version, the end-to-end capability exchange solution provided and proposed for using in the CSI phase 1 is as follows:

The static information, such as the UE capability of the opposite party, is exchanged through SIP OPTION operation on IMS and buffered locally;

In the case that a CS call has been established first, dynamic information, such as the radio capability of network, is exchanged by IE subaddress or UUS 1 (User-to-User Signaling 1) in the call control signaling during the call establishment; and in the case that an IMS session has been established first, it is exchanged through SDP offer/answer mechanism and corresponding extension of SIP header/SDP body (Session Description Protocol body) during the IMS session establishment.

In case that the local party has not stored the UE capability of opposite party, the UE information can also be exchanged directly during the IMS session establishment through SDP offer/answer mechanism and the corresponding extension of SIP header/SDP body.

However, the above described capability exchange method doesn't take into account the case that the same IP multimedia public user identity (IMPU) may be shared by multiple user equipments. For this case, in IMS system, it is handled by serial or parallel Forking mode, that is, for multiple addresses (corresponding to a registered UE sharing this IMPU respectively) under this IMPU, the system forwards service requests to them sequentially or in parallel, at this time, it is impossible to determine in advance which UE will respond to this service request ultimately. Therefore, as OPTION operation can only be initiated for IMPU, in the case that one IMPU is shared by multiple UEs, the UE of the opposite party is unable to determine the capability of which UE has been exchanged and stored, and to know whether or not the UE which established the session during the subsequent INVITE procedure is the certain UE whose capability has been stored at the local party.

Furthermore, the user may change the terminal in use at any time, and the capability of each terminal may be different. The current capability exchange mechanism has no means which can detect effectively that the user of opposite party has changed terminal and re-exchange of capability information is needed. This makes the UE capability information of the opposite party stored at local party lose reliability. In addition, periodically updating of capability information blindly can not solve the problem effectively and will cause extra burden on the network.

In addition, the services in CSI phase 1 require the CS call and IMS session that have been established successively must be established between the same two UEs. In the case that a CS call is established first, it is permitted for the service control mechanism, such as call forwarding on CS, to determine the ultimate receiver, and display the user number connected ultimately to the opposite party by call display related services, so that the subsequently initiated IMS session can be established between exactly the two UEs. As there may be the cases that IMPU is shared by multiple UEs in IMS and some services in IMS domain may result in session redirection, though it is possible to know the user number of the opposite party in the established CS call and to obtain the corresponding IMPU according to the existing solution, it is unable to ensure that the IMS session be established as expected to that certain UE of opposite party to which the CS call has been established.

SUMMARY OF THE INVENTION

The present invention provides a method of capability exchange and routing control to solve the following problem: in the case that an IMPU is shared by multiple UEs or the user changes the terminal in use in the CSI application, it is unable to effectively identify whether the UE of opposite party involved in service interaction is the UE to which the capability information obtained at the local party corresponds, and thereby it is unable to judge whether this capability information is suitable for the present session. The present invention further solves the problem in the prior art that it is unable to send the service request initiated to the designated UE of the opposite party precisely according to service requirement.

The present invention provides the following technical solution:

A method of using equipment identity (ID) in IMS network, wherein a User Equipment (UE) involved in capability exchange sending its equipment ID and capability information to a UE of opposite party; each of the two UEs storing service ID, capability information and equipment ID of the UE of the opposite party as well as the correlation among them; the equipment ID uniquely identifies a UE in the network and can be used to distinguish multiple UEs sharing a same IP multimedia public user identity (IMPU).

Wherein:

A UE sends a service request or a response to service request, in which equipment ID of the sending UE is included; a UE, which receives the service request or the response to service request, looks up in the locally stored service ID, capability information and equipment ID of the opposite party as well as the correlation among them in accordance with the received equipment ID and service ID, and judges whether the capability information of the UE, which sends the request or response, is stored locally, and then performs subsequent service handling in accordance with the result of the judgment.

The UE that receives the service request or the response to service request initiates capability exchange immediately or subsequently with the UE which sends the request or response, if the UE that receives the service request or the response to service request determines the capability information of the UE, which sends the request or response, is not stored locally; or determines whether to initiate CSI related operation in subsequent interaction with the UE which sends the request or response, in accordance with the capability information of the UE which sends the request or response, if the UE that receives the request or response determines the capability information is stored locally.

The UE carries the equipment ID of destination UE in a subsequent service request, so that Service Control Function entity in the network can utilize the equipment ID to query the correlation among the equipment ID, the service ID, and addresses of UEs established during capability exchange or UE registration to determine the address of the expected destination UE, and thereby route the service request to the correct destination UE.

The UE designates a CSI capable UE of the opposite party as the destination UE from intension of using CSI service when initiating a service request, and includes the corresponding equipment ID in the service request; or in accordance with the established CS call, the UE that initiates a service request designates the UE of the opposite party, to which the CS call connection is established, as destination UE when initiating a subsequent IMS session setup request for CSI service, and includes the corresponding equipment ID in that service request.

If there is no change in UE capability, the service request initiated or received will be performed in accordance with the existing SIP protocols; if the UE capability has changed, the UE will perform capability exchange when initiating or receiving a service request, that is, its equipment ID and capability information will be included in a service request to send to UE of the opposite party or its equipment ID and capability information will be included in a subsequent response message after the UE receives a service request from the opposite party, and the opposite party will update capability information stored locally in accordance with the equipment ID.

A UE starts a timer after it receives and stores capability information of opposite party and said correlation; if the timer expires, the UE will delete said capability information and correlation.

A UE can include its equipment ID in the initiated service request or a response to service request; the opposite UE finds the locally stored correlation and the corresponding timer in accordance with said equipment ID and service ID and then resets the timer, when it receives a service request or a response to service request that carries the equipment ID.

After receiving a service request or a response to service request, if a UE detects that the opposite party is using the capability information in accordance with said equipment ID and service ID stored locally during session negotiation, the UE will reset the timer.

The equipment ID may be International Mobile Equipment Identity (IMEI), Media Access Control (MAC) address, or Mobile Equipment Identity (MEID); or the equipment ID corresponds to the combination of IMEI, MAC or MEID and their corresponding network type; or the equipment ID corresponds to combination of service ID and corresponding serial number or feature tag of UE; wherein, said serial number or feature tag can effectively distinguish multiple UEs sharing a same IMPU.

The equipment ID can also include a version number to indicate whether capability information of the local UE stored in UE of the opposite party has changed, so that the UE of the opposite party can judge whether it stored the updated capability information of the local UE in accordance with said equipment ID and version number.

The service request includes, but is not limited to, session setup request (INVITE), capability inquiry request (OPTION), and message request (MESSAGE) in IMS domain, as well as call control related messages and user information related messages in CS domain.

The capability information comprises UE capability information and/or user IDs used by the UE to establish calls/sessions in other domains.

Said capability exchange is an abstract concept and can be accomplished in one two-way exchange between the UEs involved in the exchange, or be accomplished in two request and response procedures, which can be cause and effect of each other or independent from each other, between the UEs involved in the exchange, wherein a one-way capability information sending process is the basic sub-process.

A method of implementing UE capability exchange for parallel IP Multimedia Subsystem (IMS) and Circuit Switched (CS) services in communication system, comprising the following steps:

A. a first UE sending a message, in which service ID, equipment ID, and capability information of the first UE are included, to a second UE in accordance with triggering condition;

B. IMS network or CS network receiving and forwarding the message to a second UE;

C. the second UE receiving the message and storing the service ID, equipment ID, and capability information of the first UE contained in the message.

Wherein:

The second UE establishes a correlation between the information in the step C.

The triggering condition described in step A is: the second UE sending a request to the first UE in accordance with a triggering condition to request the first UE to send its capability information to the second UE; or the first UE detecting that the capability information of the opposite party stored locally has changed; or the first UE detecting that its capability information has changed; or the first UE detecting that capability update timer expires; or the first UE detecting that the capability information of the opposite party has not been stored locally.

The triggering condition for the second UE is the second UE detecting that the capability information of the opposite party stored locally has changed; or the second UE detecting that its capability information has changed; or the second UE detecting that capability update timer expires; or the second UE detecting that the capability information of the opposite party has not been stored locally.

The message described in step A is a request or response message that is sent independently; or a service request sent from the first UE to the second UE, i.e., the content in the message described in step A is included in the service request and sent together with the service request; or a response to service request sent from the first UE to the second UE, i.e., the content of the message described in step A is included in the corresponding response message and sent together with the response message after the service request is received.

Equipment ID of the originating UE is included in a service request or response to service request sent from it; the first UE or the second UE determines whether the capability information of the opposite party has been stored locally in accordance with the equipment ID contained in the received service request or response to service request.

The service request includes, but is not limited to, session setup request (INVITE), capability inquiry request (OPTION), and message request (MESSAGE) in IMS domain, as well as call control related messages and user information related messages in CS domain.

The equipment ID can further contain version number information of UE capability, so that the first UE or the second UE can determine whether the capability information of the opposite party stored locally has changed in accordance with the equipment ID and version number information contained in the received service request or response.

The equipment ID can be used to uniquely identify a UE in the network and distinguish multiple UEs sharing a same IMPU.

The equipment ID corresponds to International Mobile Equipment Identity (IMEI), Media Access Control (MAC) address, or Mobile Equipment Identity (MEID); the equipment ID corresponds to the combination of IMEI, MAC or MEID and their corresponding network type; or the equipment ID corresponds to combination of service ID and corresponding serial number or feature tag of UE; wherein, said serial number or feature tag can effectively distinguish multiple UEs sharing a same IMPU within the extent of the IMPU.

The capability information comprises capability of the first UE and/or user IDs used by the first UE to establish calls/sessions in other domains.

The method further comprises the following steps after step C: the second UE designating a CSI capable UE (take the first UE as an example) as the destination UE, in accordance with the intension for using CSI service when initiating a service request, and including the equipment ID of the first UE in the service request; or in accordance with an established CS call, the second UE designating the first UE, to which the CS call is connected, as destination UE in the subsequent IMS session setup request which initiates CSI service, and including the equipment ID of the first UE in that service request; service control function entity in the network utilizing the equipment ID to look up the correlation among equipment ID, service ID, and UE address established during capability exchange or UE registration and thereby route the service request to the corresponding destination UE.

The service request includes, but is not limited to, session setup request (INVITE), capability inquiry request (OPTION), and message request (MESSAGE) in IMS domain, as well as call control related messages and user information related messages in CS domain.

Step C further comprises: the second UE starting a timer for the capability information and corresponding correlation after receiving and storing the capability information of the opposite UE and the correlation; deleting the capability information and the correlation, if the timer expires later.

The method further comprises the following steps after step C: the first UE including its equipment ID and/or service ID in a subsequent service request or a subsequent response to service request; the second UE receiving the service request or the response to service request, and looking up in locally stored correlation and corresponding timer in accordance with the equipment ID and/or the service ID of the first UE carried in the service request or response to service request, and resetting said timer.

The method further comprises the following steps after step C: after the second UE receiving a subsequent service request or a response, if the opposite party has used the capability information and service ID, the first UE stored locally during session negotiation, the second UE looking up in locally stored correlation and corresponding timer in accordance with the capability information and the service ID, and resetting the timer.

The method further comprises the following steps after step C: the first UE including its equipment ID in a subsequent service request or a subsequent response to service request; the second UE receiving the service request or the response to service request, and determining that capability information of the first UE is stored locally in accordance with the equipment ID carried in the service request or response to service request as well as locally stored information in step C.

The second UE receives the service request or the response to service request and determines that the capability information of the first UE is stored locally, and judges whether the CSI operation can be initiated in subsequent interactions with opposite UE in accordance with the capability information.

Said service request includes, but is not limited to, session setup request (INVITE), capability inquiry request (OPTION), and message (MESSAGE) request in IMS domain, as well as call control related messages and user information related messages in CS domain.

A method of implementing route control for parallel IMS and CS services in communication system, comprising the following steps:

A. a first UE sending a service request to the second UE, in which the service request contains equipment ID of the second UE;

B. service control function entity in network looking up established correlation among equipment ID, service ID, and UE address of UEs utilizing the equipment ID of the second UE contained in the service request, and obtaining the contact address of the second UE;

C. the service control function entity forwarding the service request to the second UE in accordance with the contact address of the second UE.

Wherein:

The first UE or the second UE provides its equipment ID during registration or capability exchange procedure; the service control function entity obtains the equipment ID and establishes correlation among the equipment ID, service ID, and address of the UE; the equipment ID identifies a UE effectively in the network.

The first UE or the second UE provides its feature tag during registration procedure; the service control function entity assigns a equipment ID to the UE in accordance with the feature tag and establishes correlation among equipment ID, service ID, and address of the UE; the feature tag and the equipment ID identify effectively a UE in multiple UEs sharing a same IMPU.

The equipment ID of destination UE contained in said service request is designated by the UE that initiates the service request in accordance with the requirement of the internal service logic.

A UE designates a CSI capable UE of opposite party as destination UE in accordance with the intension for using CSI service when initiating a service request, and includes corresponding equipment ID in the service request; or in accordance with an established CS call, the UE that initiates the service request designates a UE of opposite party, to which the CS call connection is established, as the destination UE when initiating a subsequent IMS session setup request for CSI service, and includes the corresponding equipment ID in that service request.

Said service request includes, but is not limited to, session setup request (INVITE), capability inquiry request (OPTION), and message (MESSAGE) request in IMS domain, as well as call control related messages and user information related messages in CS domain.

In the present invention, through adding equipment ID of the UE in the capability exchange and buffer mechanism, both of the UEs can store capability information of the specific UE of the opposite party and know the exact UE corresponding to the each capability whenever one of them initiates a service request, furthermore, the equipment ID of the UE may also be added during user registration and service interaction procedure, so that the service control function entity in the network and related UEs can store and use the information, and thereby each service interaction is oriented to a specified UE; therefore, the problem that it is unable to perform effective capability exchange and to store updated UE capability information, as well as the problem that it is unable to control and send initiated service request to the designated UE as required, in the case that multiple UEs share a same IMPU or the user changes his/her terminal, are avoided, and thereby the service operation efficiency and user satisfaction can be improved.

DETAILED DESCRIPTION OF THE PREFERRED EMBODIMENTS

In order to be able to identify accurately the individual UEs under a service identity (Service ID) in the case that the service identity is shared by multiple UEs (e.g., IP Multimedia Public Identity (IMPU)), a UE involved in capability exchange or service interaction carries the equipment identity (equipment ID) of the local party, and the UE of the opposite party and/or the service control function entity, such as CSCF, in the network utilize said equipment ID to identify that UE in the present invention.

In IMS domain, each subscribed IMS service user is assigned one or more private user identities by the home network operator, the identities are used during registration, authorization, management, and billing, and usually not open to the external and stored in the user's ISIM card; each IMS user also has one or more public user identities, which are open to the external for identifying itself and finding the other party during communication with other users. Different from said public user identities or private user identities, however, the equipment identity in the present invention is an identity that can effectively identify a particular UE. On one hand, multiple equipment identities may share one public user identity (IMPU); on the other hand, there may be the case that multiple private identities (IMPIs) correspond to the same equipment identity in the case of multi-mode UE. It will occur that the same private user identity corresponds to different equipment identities before and after a user replaces a terminal but still uses the original ISIM card.

During capability exchange, UE at each of the two parties add its own equipment identity into a message which will pass capability information of the local party to the opposite party, the message being transmitted to the opposite party through the network; the party that has received the capability information of the opposite party stores said capability information and associates it with the equipment identity and the service identity of the opposite party received at the same time. The message which passes capability information of the local party to the opposite party may be a SIP INVITE request and its response, a SIP OPTION request and its response or a Circuit Switched Signaling.

Said capability information comprises UE capability of a UE and/or user IDs that are used by the UE to establish calls/sessions in other domains.

Said capability exchange is an abstract concept and can be accomplished in one two-way exchange between the UEs involved in the exchange, or be accomplished in two request and response procedures, which are cause and effect of each other or independent from each other, between the UEs involved in the exchange, wherein a one-way capability information sending process is the basic sub-process.

The capability exchange procedure may be triggered by different conditions, for example, the capability information of the opposite party stored locally is detected to be changed; or, its own capability information is detected to be changed; or, the local capability update timer has expired; or the capability information of the opposite party has not been stored locally.

That is to say, for UE A and UE B, the triggering condition for a one-way capability information sending process of UE A may be: UE B sends a request to UE A in accordance with triggering condition, to request UE A to send its capability information to UE B; or UE A detects the capability information of UE B stored locally has changed; or UE A detects its own capability information has changed; or UE A detects the capability update timer has expired; or UE A detects the capability information of the UE B has not been stored locally. The triggering condition for sending a request from UE B to UE A may be: UE B detects the capability information of UE A stored locally has changed; or UE B detects its own capability information has changed; or UE B detects the capability update timer has expired; or UE B detects the capability information of UE A has not been stored locally.

Besides this, its own equipment ID of a UE may also be carried in a service request or response to service request sent from this UE; thus, when the party which has received service request decides whether to use CSI, if the corresponding service identity is found to be associated with multiple capability information of opposite UE, it further judges whether the capability information of the UE sending the request has been included in them, which is implemented by matching equipment identity. If the match fails, it means that the UE sending the request hasn't performed capability exchange with the UE receiving the request, in this case, the UE receiving the request will operate as in the case that the capability information of the opposite UE has not been exchanged in advance, for example, performing capability negotiation during service interaction, which will not be described in detail herein; if the match is successful, whether the capability of the opposite UE indicated by the corresponding equipment identity is able to support the implementation of CSI is further examined.

Furthermore, in order to save memory resource, a UE may perform aging treatment to the capability information of a UE of opposite party stored in it; that is, starting a timer after it has received and stored the capability of the opposite party and correlation information. If the capability information is found by matching the equipment identity in received service request or response message during timing process, the timer is reset; if the timer expires, the corresponding capability information and correlation will be deleted to prevent invalid data from occupying the local memory for long.

Furthermore, in the present invention, a version number can also be added besides the equipment ID, so as to inform the opposite party that the stored capability information of the local party has been changed. For instance, suppose the capability information stored originally in the UE of opposite party is C1/C2/C3, which corresponds to a current version number; later, the UE capability changes and supports C1/C2/C4, which corresponds to a new version number; in that case, after the capability has changed, the new version number is added in the service request or response message from the UE, in which the equipment ID remains unchanged; after receiving the message with the new version number, the UE of opposite party becomes aware that the capability of the UE has changed, therefore will perform capability exchange during this service interaction or will initiate a subsequent capability exchange procedure.

Figure 2:
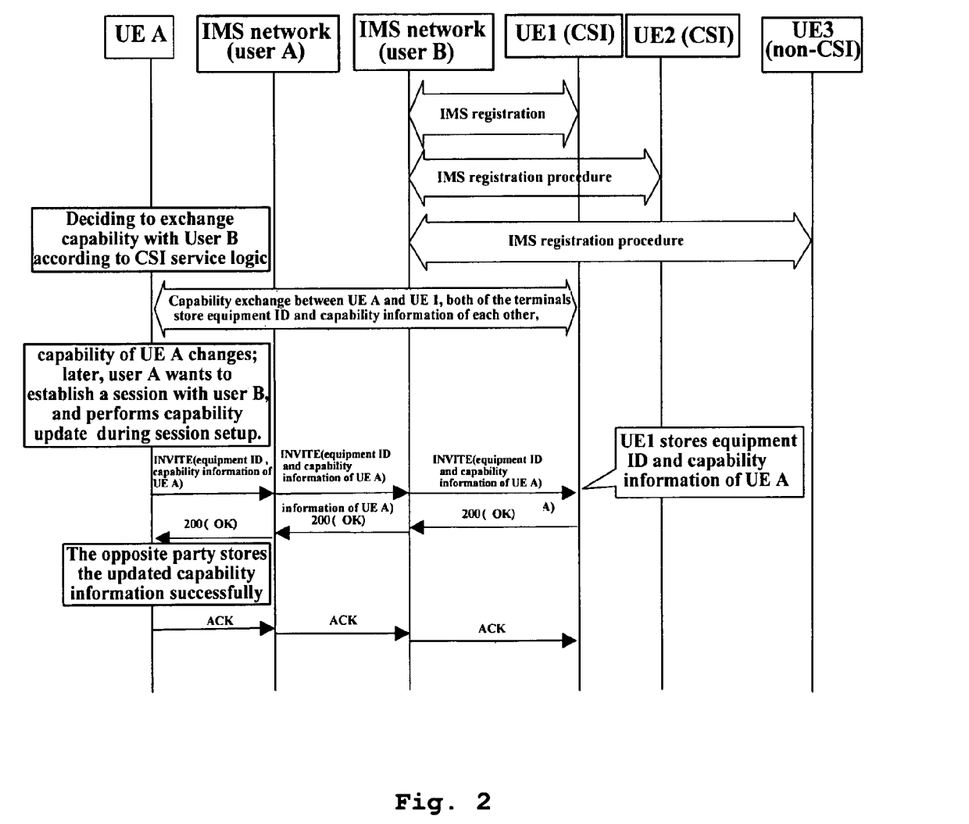
FIG. 2 is a flowchart of processing when the UE capability changes according to an embodiment of the present invention.

In order to reduce the influence on the existing SIP protocol, equipment ID may be used by a UE only in capability exchange procedure but not in subsequent service request or response messages. If there is no change in the capability of a UE, service request initiated or received by the UE is performed according to the existing SIP protocol; if the capability of the UE has changed, the UE will perform capability exchange when it initiates or receives a service request, that is, equipment ID of the UE and capability information of the local party will be included in service request sent from the UE to the opposite party, or equipment ID of the UE and capability information of the local party will be included in a response message sent to the opposite party when the UE receives a service request from the opposite party, and the UE of the opposite party will update the stored capability information for the corresponding equipment ID and service ID of the UE. As shown in an embodiment in FIG. 2.

Similarly, in order to save memory resource, a UE may perform aging treatment to the capability information of a UE of opposite party stored in it; that is, starting a timer after it has received and stored the capability of the UE of the opposite party and correlation information. If the capability information, which is stored at the local party and corresponds to the equipment ID and service ID of the UE of the opposite party, is utilized by the UE of the opposite party, the timer is reset; if the timer expires, the corresponding UE information will be deleted to prevent invalid data from occupying the local memory for long.

The problem of distinguishing multiple UEs sharing one IMPU may be solved using equipment IDs during capability exchange as described above, the same problem existing in route control can also be solved using equipment IDs. This requires the correlation among equipment ID, service ID, and address of UE to be established in the service control function entity, such as CSCF entity, in the home network of users, the correlation may be established in either of the following ways:

1. During capability exchange described above or UE registration, a UE may send an equipment ID of the UE, which is in use, to the service control function entity in the home network. The function entity, which is responsible for processing service logic and deciding route path in the IMS network, such as S-CSCF, adds the equipment ID besides the stored information, such as user's service identity, UE's address and the like, so as to establish correlation between the service identity, the equipment identity, and the UE's address.

2. The UE provides its unique feature tag during registration procedure; the service control function entity assigns an equipment ID to the UE and establishes the correlation in accordance with the feature tag.

Thus, when initiating a service request subsequently, the UE designates a UE of the opposite party in accordance with the requirement of its internal service logic, and includes the equipment ID in the service request, so that the equipment ID can be involved in the subsequent service handling and routing process.

The UE of one party can designate a UE with certain CSI service capability of the opposite party, from the intention for using CSI service when it initiates a service request, and includes the corresponding equipment ID in the service request. For example, if the UE decides to use CSI service and expects the service request to be sent to a CSI capable UE of the opposite party when it sends an INVITE message, or the UE initiates an inquiry request, such as OPTION message, when it tries to inquire the capability of a specific UE, the party that initiates the request will include equipment ID of the destination UE in the request message. In this way, even when there are more than one UEs sharing a same service ID, all of which support CSI, the service control function entity, such as CSCF entity, can still decide a route to locate the exact UE of the opposite party, in accordance with the designated service ID and equipment ID and the correlation which is established and stored previously among the service ID, the equipment ID, and the user address, when the service control function entity has received the service request message described above. This is different from the usual way that the service control function entity performs serial attempts to multiple addresses or forwards the service request simultaneously to the multiple addresses. As a result, the user that initiates a session request can ensure the UE of the opposite party, which performs the service interaction with it, is the designated UE, through designating the equipment ID corresponding to the UE of the opposite party.

Similarly, when a UE sets up a CS call with a UE of the opposite party first and expects to establish subsequently an IMS session with this UE of the opposite party, the equipment identity of the UE of the opposite party may be included in the IMS session setup request message, so as to effectively control the route of the subsequent IMS messages. In this case, said UE obtains the equipment identity of the UE of the opposite party by transferring the equipment identity of the UE of the opposite party in the CS call signaling or by inquiring the correlation between MSISDN and equipment identity established during capability exchange. The control is directed to this UE, subsequently in the procedure of SIP signaling interaction, such as in the process of IMS INVITE session or OPTION/MESSAGE transaction.

Figure 3:
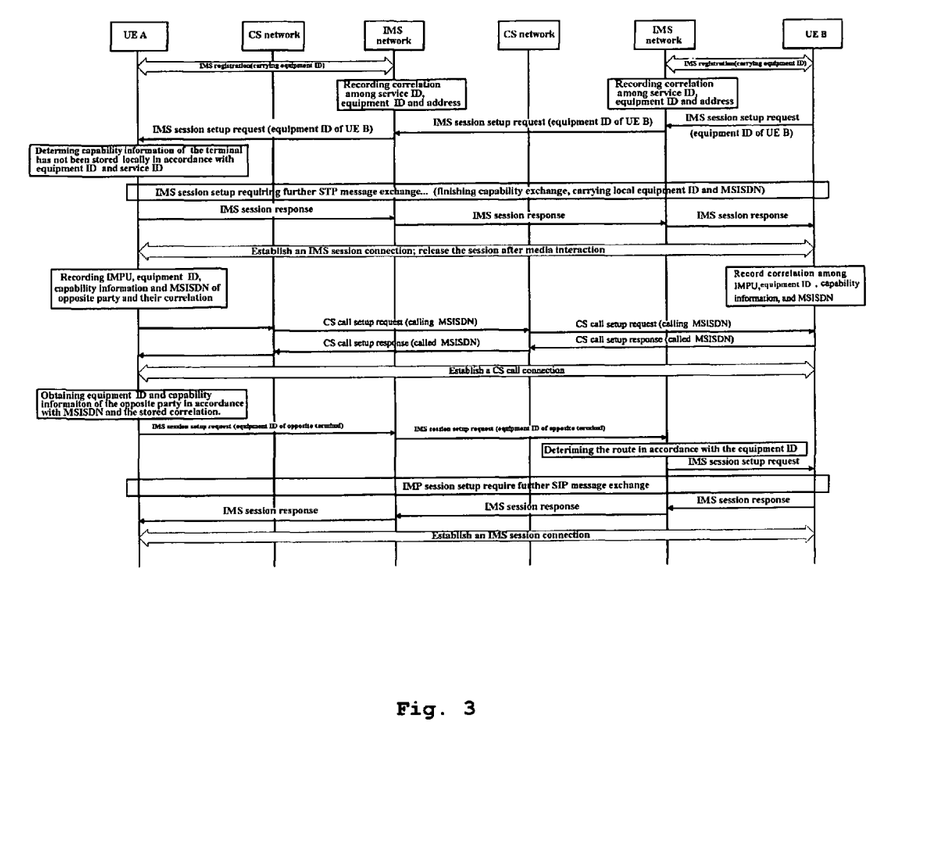
FIG. 3 is a general flowchart of capability exchange between UEs and the use of equipment IDs in CSI service according to the embodiment of the present invention.

As shown in FIG. 3, the overall process of utilizing equipment ID during capability exchange between UEs and route control in CSI service in the present invention is as follows:

First, each of the UEs at the two parties sends equipment identity at its local party during the registration process. The service control node in the home domain stores and correlates the new equipment identity with the information that are recorded and stored during the previous registration process, such as service identity and address and the like; in an IMS session setup request initiated subsequently by user B to user A, the equipment identity of user B is included in the session setup request message. When the message has been received by the UE of user A, the UE of user A looks up in the local record in accordance with the service identity and equipment identity thereof, and finds the capability information of the UE of the opposite party has not been stored. According to the subsequent service demand, the UE of user A accomplishes capability exchange with that UE of the opposite party during the IMS session setup process (or after the session is ended), and stores the capability information obtained from the exchange as well as equipment identity and service identity and correlates them, in which MSISDN number, which is used by the UE of the opposite party in CS domain, is included. After that, a CS call is established between the UE of user A and the UE of user B, and the MSISDN number of the UE of the opposite party is obtained through CS call signaling during the call setup process; the UE of user A finds the capability information and equipment identity of the UE of the opposite party in accordance with said MSISDN number and the correlation stored previously. After determining that the UE of the opposite party has CSI capability, the UE of user A designates an equipment identity of the UE of user B in the IMS session setup request which is initiated subsequently and correlated with CSI service; the service control entity in the home IMS network of user B sends the IMS session setup request message to the designated UE; finally, a CS call and an IMS session are established between the same two UEs in accordance with CSI service requirement.

Hereinafter, the method is described with embodiments of the present invention:

1. Suppose there are UEs 1, 2, and 3, which share a same IMPU, and UEs 1 and 2 both support CSI while UE 3 does not; if another user in the network expects to establish CSI service with this IMPU, it performs capability exchange buffering with these UEs; the corresponding equipment identities are also included when these UEs send capability information to the user; these information are stored by the UE of opposite party, and meanwhile, the corresponding correlation is also stored in the service control function entity, such as CSCF entity in the network; when the service is really started, this user decides to initiate a service request, which carries equipment identity of 1, to UE 1; the service control function entity in the network further judges that this is a service request which should be sent to UE 1, in accordance with the equipment identity when it receives the service request; therefore, the message is routed to the proxy server serving UE 1, then is forwarded to UE 1.

2. First, user A performs capability exchange with another user B in the network, and both UEs store the capability information of the UE of the opposite party and the corresponding equipment identity; later, user A changed the terminal due to some reasons but didn't update the capability information with user B at once; subsequently, when sending a service request message for initiating CSI service, the equipment identity of the new UE of user A can also be included in the request message sent to user B; when receiving the request message, user B finds the capability information corresponding to the received equipment identity under the same IMPU is unavailable and becomes aware that the UE of the opposite party has changed or a new UE has been added, therefore, user B needs to re-exchange with user A immediately for capability information, so that both of the parties store the latest capability information of the opposite UE, which can be used to make a decision whether to establish CSI service, thereby avoiding errors during subsequent processing, which would occur if the session is established with the old capability information. And the old UE information will be aged and cleared if there is no service request received from the old UE for a certain time.

Figure 4:
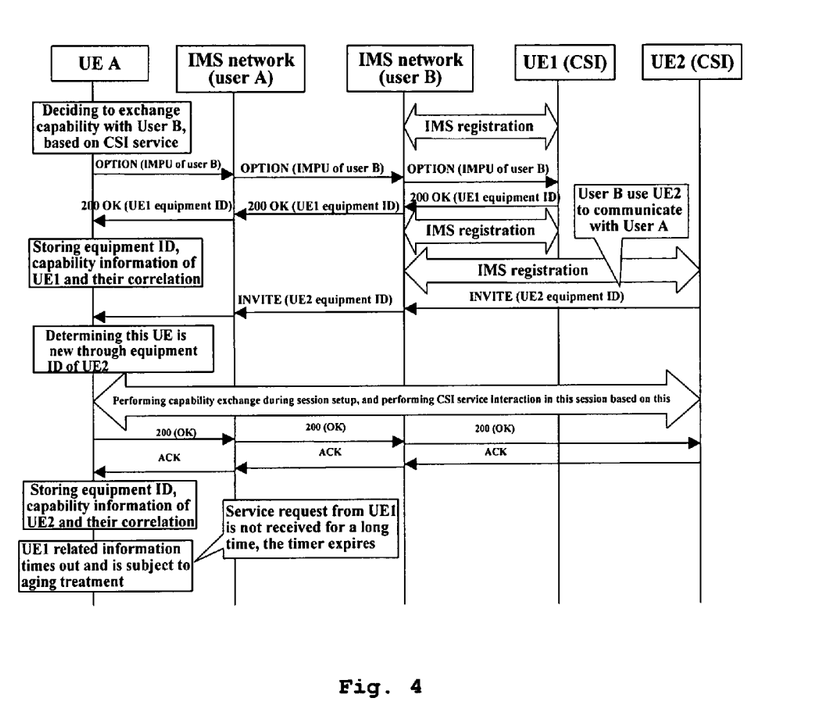
FIG. 4 is a flowchart of processing when a UE is changed according to the embodiment of the present invention.

A specific executing process of this embodiment is shown in FIG. 4. Capability information exchange has to be performed again when the user changes its terminal and initiates subsequently a service request. As shown in FIG. 4, user B performs UE capability information exchange with UE A of user A using UE 1 and establishes a corresponding session; later, user B replaces UE 1 with UE 2 and sends a new service request (containing equipment ID of UE 2); user A receives the request, looks up in the correlation information stored locally and finds there is no capability information of UE 2; thus, a new capability exchange is performed; as a result, a corresponding correlation is established on the two UEs and the function control entity in the network, this correlation is the basis for subsequent service handling and routing. The aging treatment process described above is also demonstrated in FIG. 4. If UE A doesn't receive any service request containing equipment ID of UE 1 or UE A doesn't use the stored capability information of UE 1 for a certain time, the timer related with equipment ID of UE 1 in UE A expires; therefore, aging treatment is carried out, thereby the corresponding UE information stored locally is deleted, so as to save the memory resource.

3. The UE of user A decides whether to send IMS service request initiated subsequently to a designated UE of the opposite party, in accordance with whether to perform CSI related interaction with the opposite party or whether a CS call has been established with the opposite party that is: if there is no CS call currently in the established IMS session, the IMS service may be selected without restriction, and the equipment identity of the UE of the opposite party is not included in the session setup request; if there is no CS call currently in the established IMS session but subsequent CSI related interaction is expected, since multiple UEs of the opposite party have different capabilities, equipment identity is included in the session setup request to designate a specific CSI capable UE; if there is a CS call currently in the established IMS session, it is necessary to ensure that both the IMS session and the CS call should be terminated at the same user equipment of the opposite party; therefore, equipment identity of UE of the opposite party shall be included in the session request, the service control function entity utilizes the equipment identity to control the route to the designated UE of the opposite party, so as to meet the requirement of CSI service.

Figure 5:
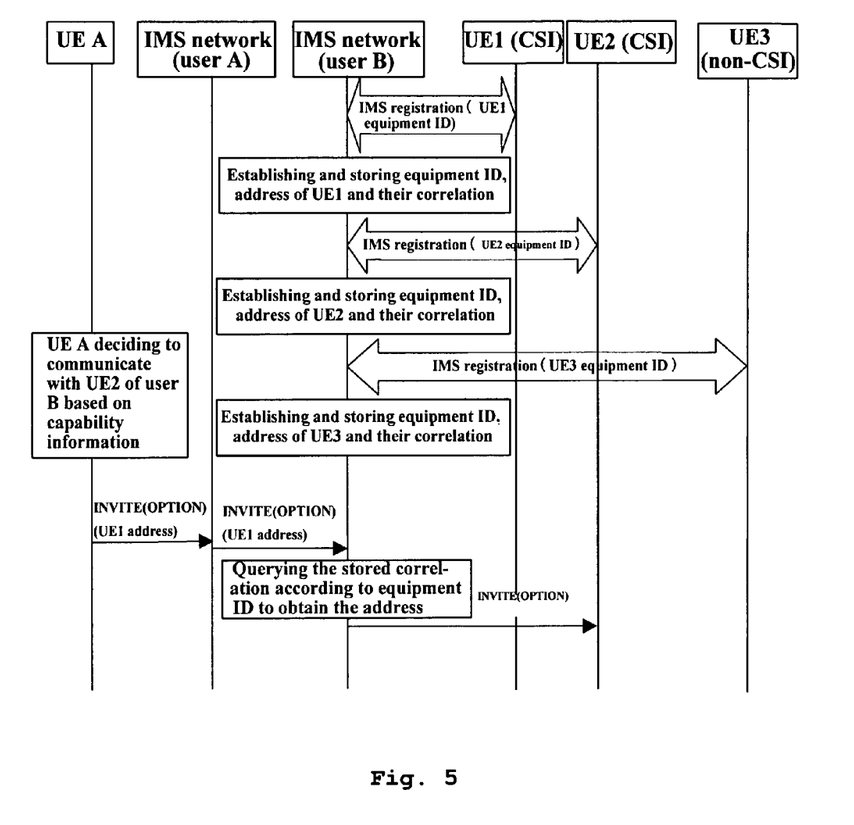
FIG. 5 is a schematic diagram of utilizing equipment IDs in route control according to the embodiment of the present invention.

As shown in FIG. 5, UE1, UE2 and UE3 provide their equipment IDs in the registration process; the service control node of their home network establishes and stores the correlation among equipment IDs, service IDs, and terminal addresses of these UEs. Later, user A decides to initiate an IMS session to UE2 of user B and includes equipment ID of UE2 in a session request; the service control node in the home network of user B queries the stored correlation in accordance with the equipment ID of UE2 and obtains the address of UE2, then, routes the session to UE2.

The equipment ID described in the present invention is an ID that can identify a UE effectively, and can be constructed in different ways, for example, the globally unique Media Access Control (MAC) address may be used. In consideration that identifying and naming of UEs in different access networks may be different, the type of the access network to which the UE is connected can be determined first, and the ID information of the UE can be further determined on that basis. For instance, the equipment identity information of a UE is IMEI when accessing via GSM/GPRS/WCDMA. It can be MAC address when accessing in the way of xDSL/WLAN, and is MEID (Mobile Equipment Identifier) when accessing in the way of CDMA 2000. For some access networks in which such information of equipment ID is not defined, information of equipment ID may be defined for them, in order to meet future demand. Also, Serial number or feature tag of equipment can be added on the basis of service ID to form an equipment ID. For example, if one service ID is IMPU1, one equipment ID can be represented by the IMPU1 plus a serial number or a feature tag of equipment which is not repeated within all the UEs that share the IMPU1. Thus, a UE can be identified effectively on UEs and in network by integrating service ID and serial number or a feature tag of the UE.

Equipment IDs can be constructed in any of the above ways, without affecting the nature of application of equipment IDs in the method for capability exchange and route control as described in the present invention, as long as a equipment ID can effectively identify a UE in an access network, and in particular, identify effectively a UE of multiple UEs sharing a same IMPU.

It is apparent that those skilled in the art can make various modifications and variations to the methods described in the present invention, without departing from the spirit and scope of the present invention. So, if any of such modifications or variations is within the scope defined in the accompanying claims and their equivalents, it is intended that these modifications or variations should be included within the present invention.

The invention claimed is:

1. A method of using an equipment identity (ID) in an IP Multimedia Subsystem (IMS) network, comprising:
   receiving an equipment ID, a service ID, and capability information of a first User Equipment (UE), sent from the first UE, by a second UE; and
   storing, by the second UE, the service ID, the capability information, and equipment ID of the first UE, as well as a correlation among the service ID, the capability information, and the equipment ID of the first UE,
   wherein the equipment ID uniquely identifies a UE among multiple UEs sharing a same IP multimedia public user identity (IMPU) in the network.

2. The method as in claim 1,
   wherein the equipment ID and/or the capability information of the first UE is included in a service request or a response to service request when sending from the first UE,
   and wherein the second UE that receives the service request or the response to service request looks up in the locally stored service ID, the capability information and the equipment ID of the first UE as well as the correlation among them in accordance with the received equipment ID and service ID, and judges whether the capability information of the first UE is stored locally, and performs service handling in accordance with a result of the judgment.

3. The method as in claim 2, wherein
   the second UE initiates capability exchange with the first UE, if the second UE determines the capability information of the first UE is not stored locally; or determines whether to initiate a CSI related operation in subsequent interaction with the first UE in accordance with the capability information of the first UE, if the second UE determines the capability information is stored locally.

4. The method as in claim 1, wherein
   the first UE or the second UE includes the equipment ID of destination UE in a subsequent service request, so that a Service Control Function entity in the network can utilize the equipment ID to query the correlation among the equipment ID, the service ID, and addresses of UEs established during a capability exchange or a UE registration to determine the address of expected destination UE, and thereby routing the service request to correct destination UE.

5. The method as in claim 4, wherein the first UE or the second UE designates a CSI capable UE of the opposite party as a destination UE from intention of using CSI service when initiating a service request, and includes the corresponding equipment ID in the service request; or in accordance with the established CS call, the first UE or the second UE that initiates a service request designating the UE of the opposite party, to which the CS call connection is established, as the destination UE when initiating a subsequent IMS session setup request for CSI service, and including the corresponding equipment ID in that service request.

6. The method as in claim 1, wherein if there is no change in the capability of the first UE or the second UE, the service request initiated or received will be performed in accordance with the existing SIP protocol;

if the capability of one of the first UE and the second UE has changed, said one of the first UE and the second UE will perform a capability exchange when initiating or receiving a service request, and its equipment ID and capability information will be included in a service request to send to the other one of the first UE and the second UE, or said one of the first UE and the second UE will include its equipment ID and capability information in a subsequent response message after receiving a service request from the other one of the first UE and the second UE, and the other one of the first UE and the second UE will update capability information stored locally in accordance with the equipment ID.

7. The method as in claim 1, wherein one of the first UE and the second UE starts a timer after receiving and storing capability information of the other one of the first UE and the second UE and said correlation;

if the timer expires, said one of the first UE and the second UE will delete said capability information and said correlation.

8. The method as in claim 7, wherein the first UE or the second UE can include its equipment ID in the initiated service request or response to service request;

the first UE or the second UE finds the locally stored correlation and the corresponding timer in accordance with said equipment ID and service ID and then resets the timer, when receiving a service request or a response to service request that carries the equipment ID.

9. The method as in claim 7, wherein after receiving a service request or a response to service request, if one of the first UE and the second UE detects that the other one of the first UE and the second UE is using the capability information in accordance with said equipment ID and service ID stored locally during session negotiation, then said one of the first UE and the second UE resets the timer.

10. The method as in claim 1, wherein the equipment ID includes International Mobile Equipment Identity (IMEI), Media Access Control (MAC) address, or Mobile Equipment Identity (MEID); or the equipment ID corresponds to the combination of IMEI, MAC or MEID and their corresponding network type; or the equipment ID corresponds to the combination of service ID and corresponding serial number or feature tag of UE; and wherein said serial number or feature tag can effectively distinguish multiple UEs sharing a same IMPU within the extent of the IMPU.

11. The method as in claim 2, wherein the equipment ID further includes a version number indicating whether capability information of the local UE stored in UE of the opposite party has changed, so that the UE of the opposite party can perform said judgment in accordance with said equipment ID and said version number.

12. The method as in claim 1, wherein the service request includes a session setup request (INVITE), a capability inquiry request (OPTION), and a message request (MESSAGE) in the IMS domain, as well as call control related messages and user information related messages in the CS domain.

13. The method as in claim 1, wherein said capability information comprises UE capability information and/or user IDs used by the UE to establish calls/sessions in other domains.

14. A method of implementing route control for parallel IP Multimedia Subsystems (IMS) and Circuit Switched (CS) services in a communication system, comprising the following steps:

A) sending, by a first User Equipment (UE), a service request containing an equipment ID of a second UE;

B) utilizing, by a service control function entity in a network, the equipment ID of the second UE contained in the service request to look up an established correlation among equipment ID, service ID, and UE address of UEs, and obtaining a contact address of the second UE;

C) forwarding, by the service control function entity, the service request to the second UE in accordance with the contact address of the second UE.

15. The method as in claim 14, wherein the first UE or the second UE provides its equipment ID during registration or a capability exchange procedure;

the service control function entity obtains the equipment ID and establishes correlation among the equipment ID, the service ID, and the address of the UE;

the equipment ID identifies a UE effectively in the network.

16. The method as in claim 14, wherein the first UE or the second UE provides its feature tag during registration procedure;

the service control function entity assigns an equipment ID to the UE in accordance with the feature tag and establishes correlation among the equipment ID, the service ID, and the address of the UE;

the feature tag and the equipment ID identify effectively a UE in multiple UEs sharing a same IMPU.

17. The method as in claim 14, wherein the equipment ID of the destination UE contained in the service request is designated by the UE that initiates the service request in accordance with the requirement of the internal service logic.

18. The method as in claim 17, wherein a UE designates a CSI capable UE of an opposite party as a destination UE in accordance with the intention of using CSI service when initiating a service request, and includes corresponding equipment ID in the service request; or in accordance with an established CS call, the UE that initiates the service request designates a UE of the opposite party, to which the CS call connection is established, as the destination UE when initiating a subsequent IMS session setup request for CSI service, and includes the corresponding equipment ID in that service request.

19. The method as in any of claim 14, wherein said service request includes, but is not limited to, a session setup request (INVITE), a capability inquiry request (OPTION), and a message request (MESSAGE) in the IMS domain, as well as call control related messages and user information related messages in the CS domain.

20. A method for capability information exchange between User Equipments (UEs) in an IP Multimedia Subsystem (IMS) network, comprising:
receiving an equipment identity (equipment ID), capability information, and a service ID of a first UE, which are sent from the first UE, by a second UE;
storing, by the second UE, the capability information, the equipment ID, and the service ID of the first UE as well as a correlation among the service ID, the capability information, and the equipment ID of the first UE;
matching, by the second UE, an equipment ID and a service ID contained in a subsequently received service request or response to service request with the locally stored equipment ID and the service ID; and
initiating, by the second UE, a capability information exchange with a UE which sends the subsequently received service request or response to service request, if the equipment ID and service ID contained in the subsequently received service request or response to service request does not match the locally stored equipment ID and the service ID,
in which the equipment ID identifies a UE among multiple UEs sharing a same IP multimedia public identity (IMPU).

21. The method according to claim 20, further comprising:
receiving, by the second UE, a service request or a response to service request carrying the equipment ID of the first UE, the service request or the response to service request being sent by the first UE;
when receiving the service request or the response to service request, querying, by the second UE, a locally stored service ID, the capability information and the equipment ID as well as the correlation in accordance with the received equipment ID and service ID, and judging whether the capability information of the first UE is stored locally, and processing subsequent service in accordance with a result of the judgment.

22. The method according to claim 21, wherein the subsequent service comprises:
if judging the capability information of the first UE is not stored locally, initiating, by the second UE, a capability exchange with the first UE; if judging the capability information is stored locally, determining, by the second UE, whether to initiate Combining Circuit Switched Bearers with IMS (CSI) related operation in subsequent interaction with the first in accordance with the capability information of the first UE.

23. The method according to claim 20, further comprising:
carrying, by the second UE, equipment ID of the first UE, which is considered as a destination UE, in a subsequent service request, so that a service control function entity in the network utilizes the equipment ID of the first UE to query correlation among equipment ID, service ID, and addresses of UEs established during capability exchange or UE registration to determine the address of the first UE, so as to route the subsequent service request to the first UE.

24. The method according to claim 23, further comprising:
determining the destination UE by the second UE before initiating the subsequent service request, wherein:
the second UE designates the first UE which is Combining Circuit Switched Bearers with IMS (CSI) capable as the destination UE in accordance with the intension of using CSI service when initiating the service request, and carrying the equipment ID of the first UE in the subsequent service request; or when initiating an IMS session setup request subsequent to the CSI service, the second UE designates the first UE, to which an established Circuit Switched (CS) call connection is connected, as the destination UE in accordance with the established CS call, and carries the equipment ID of the first UE in the subsequent service request.

25. The method according to claim 20, wherein:
the equipment ID, the capability information, and the service ID of the first UE is carried in a message and sent by the first UE under a triggering condition,
the message is received and forwarded by the IMS network or a Circuit Switched (CS) network to the second UE.

26. The method according to claim 20, wherein said storing by the second UE the service ID, the equipment ID, and the capability information of the first UE further comprises:
establishing, by the second UE, the correlation among the service ID, the equipment ID, and capability information of the first UE.

27. The method according to claim 25, wherein the triggering condition is at least one of:
the first UE receiving a request requesting the first UE to send its capability information to the second UE, the request being sent by the second UE in accordance with a second triggering condition; or
the first UE detecting that the capability information of the second UE stored locally has changed; or
the first UE detecting that its own capability information has changed; or
the first UE detecting that a capability update timer expires; or
the first UE detecting that the capability information of the opposite side has not been stored locally.

28. The method according to claim 27, wherein the second triggering condition is at least one of
the second UE detecting that the capability information of the first UE stored locally has changed; or
the second UE detecting that its own capability information has changed; or
the second UE detecting that a capability update timer expires; or
the second UE detecting that the capability information of the first UE has not been stored locally.

29. The method according to claim 25, wherein the message is one of
a request or response message that is sent independently; or
a service request sent from the first UE to the second UE, carrying the service ID, capability information and equipment ID of the first UE; or
a response to service request sent from the first UE to the second UE, carrying the service ID, the capability information, and the equipment ID of the first UE.

30. The method according to claim 27, wherein:
the first UE or the second UE carries its own equipment ID in a service request or response to service request sent from itself subsequently;
the second UE or the first UE determines whether the capability information of the first UE or the second UE has been stored locally in accordance with the equipment ID contained in the received service request or response to service request.

31. The method according to claim 21, wherein the service request comprises a session setup request INVITE, a capability inquiry request OPTION, and a message request MESSAGE in IMS, as well as call control related messages and User Information message in CS domain.

32. The method according to claim 21, wherein the equipment ID further contains a version number information of UE capability, the first UE or the second UE determines whether the capability information of the opposite side stored locally has changed in accordance with the equipment ID and version number information contained in the received service request or response to service request.

33. The method according to claim 24, wherein:
a service control function entity in network utilizes the equipment ID to query the correlation among the equipment ID, the service ID, and the UE address established during the capability exchange or UE registration to determine the contact address of the destination UE, and route the service request to the destination UE.

34. The method according to claim 23, wherein the service request comprises a session setup request INVITE, a capability inquiry request OPTION, and a message request MESSAGE in IMS.

35. The method according to claim 20, further comprising:
starting, by the second UE, a timer after receiving the equipment ID of the first UE and storing the equipment ID, the service ID, and the capability information of the first UE and the correlation; deleting the capability information and the correlation if the timer expires.

36. The method according to claim 35, further comprising:
on receiving a service request or a response to service request sent by the first UE and carrying the equipment ID and the service ID of the first UE, querying, by the second UE, locally stored correlation and the timer in accordance with the equipment ID and the service ID of the first UE contained in the service request or response to service request, and resetting the timer.

37. The method according to claim 35, further comprising:
during a session negotiation, when receiving a service request or a response to service request carrying the capability information and service ID corresponding to the equipment ID of the first UE stored locally, querying, by the second UE, locally stored correlation and the timer in accordance with the capability information and the service ID, and resetting the timer.

38. The method according to claim 25, further comprising:
carrying, by the first UE, its equipment ID in a subsequent service request or a subsequent response to service request;
on receiving the service request or the response to service request, determining, by the second UE, that capability information of the first UE is stored locally in accordance with the equipment ID carried in the service request or response to service request as well as locally stored information.

39. The method according to claim 38, wherein after receiving the service request or the response to service request and determining that the capability information of the first UE is stored locally, judging by the second UE whether the CSI operation can be initiated in subsequent interactions with the first UE in accordance with the capability information.

40. A user equipment (UE), comprising:
means for receiving an equipment identity (equipment ID), capability information, and a service ID of a remote UE;
means for storing the equipment ID, the capability information, and the service ID of the remote UE as well as a correlation among the equipment ID, the capability information, and the service ID of the remote UE;
means for matching an equipment ID and a service ID contained in a subsequently received service request or response to service request with the locally stored equipment ID and the service ID; and
means for initiating a capability information exchange with a UE which sends the subsequently received service request or response to service request, if the equipment ID and service ID contained in the subsequently received service request or response to service request does not match the locally stored equipment ID and the service ID.

41. The UE according to claim 40, further comprising means for sending the equipment ID along with the capability information and the service ID of the UE.

42. The UE according to claim 40, further comprising means for sending the equipment ID of the UE when sending the service request or response of service request.

43. The UE according to claim 42, further comprising means for sending version number of the UE when sending the service request or response of service request.

44. The UE according to claim 40, further comprising means for determining whether the capability information of the remote UE stored locally has changed according to the received equipment ID and version number of the remote UE.

* * * * *